US005858903A

United States Patent [19]
Sylvester et al.

[11] Patent Number: 5,858,903
[45] Date of Patent: Jan. 12, 1999

[54] CATALYST, ITS PRODUCTION AND ITS USE FOR THE GAS-PHASE POLYMERIZATION OF CONJUGATED DIENES

[75] Inventors: Gerd Sylvester, Leverkusen; Hugo Vernaleken, Krefeld, both of Germany

[73] Assignee: Bayer AG, Leverkusen, Germany

[21] Appl. No.: 933,597

[22] Filed: Sep. 18, 1997

Related U.S. Application Data

[63] Continuation of Ser. No. 632,710, Apr. 15, 1996, abandoned, which is a continuation of Ser. No. 312,288, Sep. 26, 1994, abandoned.

[30] Foreign Application Priority Data

Oct. 6, 1993 [DE] Germany .......................... 43 34 045.8

[51] Int. Cl.$^6$ ...................................... B01J 31/00
[52] U.S. Cl. .................. 502/118; 502/102; 502/110; 502/111; 502/113; 502/116; 502/117; 502/120
[58] Field of Search .................................. 502/102, 110, 502/111, 113, 116, 117, 118, 120

[56] References Cited

U.S. PATENT DOCUMENTS

| | | | |
|---|---|---|---|
| 3,297,667 | 1/1967 | von Dohlen et al. ................. | 502/102 |
| 3,641,188 | 2/1972 | Yoo et al. . | |
| 3,671,462 | 6/1972 | O'Hara et al. ........................ | 252/429 |
| 3,794,604 | 2/1974 | Throckmorton et al. ............. | 502/102 |
| 3,803,053 | 4/1974 | Yoo et al. ............................. | 252/429 |
| 3,992,323 | 11/1976 | Yoo et al. ............................. | 502/117 |
| 4,242,232 | 12/1980 | Sylvester et al. ..................... | 252/429 |
| 4,242,322 | 12/1980 | Sylvester et al. ..................... | 252/429 C |
| 4,260,707 | 4/1981 | Sylvester et al. ..................... | 526/114 |
| 4,429,089 | 1/1984 | Pedretti et al. ....................... | 526/133 |
| 4,461,883 | 7/1984 | Takeuchi et al. ..................... | 502/102 |
| 4,544,718 | 10/1985 | Yeh et al. ............................. | 526/141 |
| 4,556,647 | 12/1985 | Yeh et al. ............................. | 502/102 |
| 4,575,538 | 3/1986 | Hsieh et al. .......................... | 502/102 |
| 4,619,982 | 10/1986 | Jenkins et al. ....................... | 502/102 |
| 4,791,086 | 12/1988 | Yeh et al. ............................. | 502/102 |
| 4,801,692 | 1/1989 | Gradeff et al. ....................... | 534/15 |
| 5,017,539 | 5/1991 | Jenkins et al. ....................... | 502/102 |
| 5,021,379 | 6/1991 | Martin et al. ......................... | 502/102 |
| 5,064,910 | 11/1991 | Hattori et al. ........................ | 525/359.1 |
| 5,104,950 | 4/1992 | Martin et al. ......................... | 502/102 |
| 5,189,000 | 2/1993 | Masi et al. ............................ | 502/117 |
| 5,286,694 | 2/1994 | Pettijohn et al. ..................... | 502/113 |
| 5,391,659 | 2/1995 | Pettijohn et al. ..................... | 526/114 |
| 5,484,897 | 1/1996 | Garbassi et al. ..................... | 534/15 |

FOREIGN PATENT DOCUMENTS

| | | |
|---|---|---|
| 0 007 027 | 1/1980 | European Pat. Off. . |
| 0 011 184 | 5/1980 | European Pat. Off. . |
| 0 076 535 | 4/1983 | European Pat. Off. . |
| 0 111 391 | 6/1984 | European Pat. Off. . |
| 0 201 962 | 11/1986 | European Pat. Off. . |
| 0 375 421 | 6/1990 | European Pat. Off. . |
| 0 563 557 | 10/1993 | European Pat. Off. . |
| 0 647 657 | 4/1995 | European Pat. Off. . |
| 58-61107 | 4/1983 | Japan . |
| 59-196307 | 4/1983 | Japan . |

OTHER PUBLICATIONS

Makromolekulare Chemie, Macromolecular Symposia, Bd. 66, 1. Feb. 1993, pp. 231–243, Lido Porri et al., *Recent Advances in the Field of Diolefin Polymerization with Transition Metal Catalysts* .

Macromolecular Symposia, Bd. 89, 1. Jan. 1995, pp. 393–409, Taube R. et al., *The Catalysis of the Stereospecific Butadiene Polymerization by Allyl Nickel and Allyl Lanthanide Complexes a Mechanistic Comparison* .

Makromol. Chem., Macromol. Symp. 66, 1993, pp. 273–288, David J. Wilson, *Recent Advances in the Neodymium Catalysed Polymerisation of 1,3–Dienes* . No Month Available.

SU 512 792 (May 17, 1976).

*Primary Examiner*—Elizabeth D. Wood
*Attorney, Agent, or Firm*—Connolly & Hutz

[57] ABSTRACT

Catalysts consisting of
  A) an alcoholate of the rare earths, a carboxylate of the rare earths, a complex compound of the rare earths with diketones and/or an addition compound of the halides of the rare earths with an oxygen or nitrogen donor compound,
  B) an aluminium trialkyl, a dialkyl aluminium hydride and/or an alumoxane,
  C) another Lewis acid and
  D) an inert, particulate inorganic solid with a specific surface of greater than 10 $m^2/g$ (BET) and a pore volume of 0.3 to 15 ml/g are eminently suitable for the polymerization of conjugated dienes, more particularly butadiene, in the gas phase.

21 Claims, No Drawings

CATALYST, ITS PRODUCTION AND ITS USE FOR THE GAS-PHASE POLYMERIZATION OF CONJUGATED DIENES

CROSS-REFERENCE TO RELATED APPLICATIONS

This application is a continuation of application Ser. No. 08/632,710 filed on Apr. 15, 1996, and now abandoned, which was a continuation of application Ser. No. 08/312,288 filed on Sep. 26, 1994, and now abandoned.

BACKGROUND OF THE INVENTION

1. Field of the Invention

This invention relates to a catalyst, to its production and to its use for the polymerization of conjugated dienes, more particularly butadiene, in the gas phase.

2. Description of the Related Art

Polybutadiene with a high percentage of cis-1,4-units has been produced on an industrial scale for some time and is used for the production of tires and other rubber products. The polymerization is carried out in the liquid phase using various catalyst systems. One particularly advantageous catalyst system for the production of polybutadiewne with a high percentage of cis-1,4-units is described in European patent 11 184. The catalyst system described in this document, which is used for the polymerization of butadiene in solution, consists of a carboxylate of the rare earths, an aluminium tri-alkyl and/or alkyl aluminium hydride and another Lewis acid.

The polymerization of conjugated dienes in solution has the disadvantage that, during the removal of the unreacted monomer and the solvent from the polymer formed, low molecular weight compounds can enter the environment through waste gases and wastewater and have to be disposed of accordingly.

It is also known that the polymerization of conjugated dienes can be carried out without the addition of solvents in the liquid monomers. Unfortunately, this process has the disadvantage that the polymerization reaction is accompanied by the release of a large amount of heat which is difficult to control and, accordingly, represents a certain potential danger. In addition, the separation of the polymers from the monomers again involves the risk of environmental pollution.

In recent years, the gas phase process has proved to be particularly advantageous for the production of polyethylene and polypropylene in particular and has been applied on an industrial scale. The environmental advantages of the gas phase process are attributable in particular to the fact that no solvents are used and emissions and wastewater pollution can be reduced.

Hitherto, there has been no known process for carrying out the polymerization of conjugated dienes, more particularly polybutadiene, directly from the gas phase. One reason for this may be that the Ziegler-Natta catalysts based on titanium, cobalt, nickel or neodymium used for the solution polymerization of conjugated dienes are not readily suitable for polymerization in the gas phase, particularly on account of the poor productivity, i.e. the small yield of polymer which can be obtained with a certain quantity of catalyst. Thus, the catalyst described in EP 11 184 is unsuitable for the polymerization of dienes, more particularly butadiene, in the gas phase to form polybutadiene with a high percentage of cis-1,4-units on account of the fact that its activity falls dramatically after only a short time in a gas phase polymerization (see comparison test).

SUMMARY OF THE INVENTION AND PREFERRED EMBODIMENT

It has now surprisingly been found that the polymerization of conjugated dienes, more particularly butadiene, can be carried out in the gas phase without any need for solvents providing a particulate, inert inorganic solid with a specific surface of greater than 10 $m^2/g$ (BET) and a pore volume of 30 to 1,500 ml/g is added to the catalysts known per se based on compounds of the rare earths.

Accordingly, the present invention relates to a catalyst consisting of:

A) at least on substance selected from the group consisting of: an alcoholate of the rare earths (I), 
a carboxylate of the rare earths (II), 
a complex compound of the rare earths with diketones (III) and/or 
an addition compound of the halides of the rare earths with an oxygen or nitrogen donor compound (IV) corresponding to the following formulae: $(RO)_3M$ (I), $(R-CO_2)_3M$ (II), $$(R-\underset{\underset{O}{\|}}{C}-CH-\underset{\underset{O}{\|}}{C}-R)_3M \qquad (III)$$

B) at least one substance selected from the group consisting of an aluminum trialkyl, a dialkyl aluminum hydride and an alumoxane corresponding to formulae (V)–(VIII): $AlR_3$ (V), $HAlR_2$ (VI),

(VII)

(VIII)

In the above formulae:

M is a trivalent element of the rare earths with atomic numbers of 57 to 71, the R's may be the same or different and represent alkyl radicals containing 1 to 20 carbon atoms (formulae (I) to (III)) or 1 to 10 carbon atoms (formulae (V) to (VIII)), X is chlorine, bromine or iodine, y=1 to 6 and n+1 to 50, C) another Lewis acid (i.e., a compound which is different from the compound in B and which is a Lewis acid) and D) an inert, particulate inorganic solid with a specific surface of greater than 10 $m^2/g$ (BET) and a pore volume of 30 to 1,500 ml/g.

In component A, M represents a trivalent element of the rare earths with atomic numbers of 57 to 71 as identified in the periodic system. Preferred compounds are those in which M is lanthanum, cerium, praseodymium or neodymium or a mixture of elements of the rare earths which contains at least 10% by weight of at least one of the elements lanthanum, cerium, praseodymium or neodymium. Compounds in which M is lanthanum or neodymium or a mixture of rare earths containing at least 30% by weight of lanthanum or neodymium are most particularly preferred.

The substituents R in formulae (I) to (III) are, in particular, linear or branched alkyl radicals containing 1 to 20 carbon atoms and preferably 1 to 15 carbon atoms, such as methyl, ethyl, n-propyl, n-butyl, n-pentyl, iso-propyl, isobutyl, tert.butyl, 2-ethylhexyl, neopentyl, neooctyl, neodecyl, neododecyl.

Examples of alcoholates for component A are neodymium (III) n-propanolate, neodymium(III) n-butanolate, neodymium(III) n-decanolate, neodymium(III) isopropanolate, neodymium(III) 2-ethylhexanolate, praseodymium(III) n-propanolate, praseodymium(III) n-butanolate, praseodymium(III) n-decanolate, praseodymium(III) isopropanolate, praseodymium(III) 2-ethylhexanolate, lanthanum(III) n-propanolate, lanthanum (III) n-butanolate, lanthanum(III) n-decanolate, lanthanum (III) isopropanolate, lanthanum-(III) 2-ethylhexanolate, preferably neodymium(III) n-butanolate, neodymium(III) n-decanolate, neodymium(III) 2-ethylhexanolate.

Suitable carboxylates for component A are lanthanum-(III) propionate, lanthanum(III) diethyl acetate, lanthanum (III) 2-ethylhexanoate, lanthanum(III) stearate, lanthanum (III) benzoate, lanthanum(III) cyclohexane carboxylate, lanthanum(III) oleate, lanthanum(III) versatate, lanthanum (III) naphthenate, praseodymium(III) propionate, praseodymium(III) diethyl acetate, praseodymium (III) 2-ethylhexanoate, praseodymium(III) stearate, praseodymium(III) benzoate, praseodymium(III) cyclohexane carboxylate, praseodymium(III) oleate, praseodymium (III) versatate, praseodymium(III) naphthenate, neodymium (III) propionate, neodymium(III) diethyl acetate, neodymium-(III) 2-ethylhexanoate, neodymium(III) stearate, neodymium(III) benzoate, neodymium(III) cyclohexane carboxylate, neodymium(III) oleate, neodymium (III) versatate, neodymium(III) naphthenate, preferably neodymium (III) 2-ethylhexanoate, neodymium(III) versatate, neodymium(III) naphthenate. Neodymium versatate is particularly preferred.

Suitable complex compounds for component A lanthanum (III) acetyl acetonate, praseodymium(III) acetyl acetonate, neodymium(III) acetyl acetonate, preferably neodymium (III) acetyl acetonate.

Examples of addition compounds for component A with donors are, for example, lanthanum(III) chloride with tributyl phosphate, lanthanum(III) chloride with tetrahydrofuran, lanthanum(III) chloride with isopropanol, lanthanum (III) chloride with pyridine, lanthanum(III) chloride with 2-ethylhexanol, lanthanum(III) chloride with ethanol, praseodymium(III) chloride with tributyl phosphate, praseodymium(III) chloride with tetrahydrofuran, praseodymium(III) chloride with isopropanol, praseodymium(III) chloride with pyridine, praseodymium-(III) chloride with 2-ethylhexanol, praseodymium(III) chloride with ethanol, neodymium(III) chloride with tributyl phosphate, neodymium(III) chloride with tetratetrahydrofuran, neodymium(III) chloride with isopropanol, neodymium(III) chloride with pyridine, neodymium(III) chloride with 2-ethylhexanol, neodymium (III) chloride with ethanol, lanthanum(III) bromide with tributyl phosphate, lanthanum(III) bromide with tetrahydrofuran, lanthanum(III) bromide with isopropanol, lanthanum(III) bromide with pyridine, lanthanum(III) bromide with 2-ethylhexanol, lanthanum(III) bromide with ethanol, praseodymium(III) bromide with tributyl phosphate, praseodymium(III) bromide with tetrahydrofuran, praseodymium-(III) bromide with isopropanol, praseodymium(III) bromide with pyridine, praseodymium(III) bromide with 2-ethylhexanol, praseodymium(III) bromide with ethanol, neodymium(III) bromide with tributyl phosphate, neodymium(III) bromide with tetrahydrofuran, neodymium(III) bromide with isopropanol, neodymium(III) bromide with pyridine, neodymium(III) bromide with 2-ethylhexanol, neodymium-(III) bromide with ethanol, preferably lanthanum(III) chloride with tributyl phosphate, lanthanum(III) chloride with pyridine, lanthanum(III) chloride with 2-ethylhexanol, praseodymium(III) chloride with tributyl phosphate, praseodymium(III) chloride with 2-ethylhexanol, neodymium(III) chloride with tributyl phosphate, neodymium(III) chloride with tetrahydrofuran, neodymium (III) chloride with 2-ethylhexanol, neodymium(III) chloride with pyridine, neodymium(III) chloride with 2-ethylhexanol, neodymium(III) chloride with ethanol.

The compounds of the rare earths may be used individually or in admixture with one another.

Neodymium versatate, neodymium octanoate and/or neodymium naphthenate are most particularly preferred as component A.

In formulae (V) to (VIII) of component B, R is a linear or branched alkyl radical containing 1 to 10 carbon atoms and preferably 1 to 4 carbon atoms. Examples of suitable aluminium alkyls corresponding to formulae (V) and (VI) are: trimethyl aluminium, triethyl aluminium, tri-n-propyl aluminium, triisopropyl aluminium, tri-n-butyl aluminium, triisobutyl aluminium, tripentyl aluminium, trihexyl aluminium, tricyclohexyl aluminium, trioctyl aluminium, diethyl aluminium hydride, dinbutyl aluminium hydride and diisobutyl aluminium hydride. Triethyl aluminium, triisobutyl aluminium and diisobutyl aluminium hydride are preferred, diisobutyl aluminium hydride being particularly preferred.

Examples of alumoxanes (VII) and (VIII) are methyl alumoxane, ethyl alumoxane and isobutyl alumoxane, preferably methyl alumoxane and isobutyl alumoxane.

Lewis acids are used as component C. Examples of Lewis acids are organometallic halides in which the metal atom belongs to group 3a) or 4a) and halides of the elements of group 3a), 4a) and 5a) of the periodic system as presented in the "Handbook of Chemistry and Physics", 45th Edition, 1964–65. The following halides are particularly suitable: methyl aluminium dibromide, methyl aluminium dichloride, ethyl aluminium dibromide, ethyl aluminium dichloride, butyl aluminium dibromide, butyl aluminium, dichloride., dimethyl aluminiumbromide, dimethyl aluminium chloride, diethyl aluminium bromide, diethyl aluminium chloride, dibutyl aluminium bromide, dibutyl aluminium chloride, methyl aluminium sesquibromide, methyl aluminium sesquichloride, ethyl aluminium sesquibromide, ethyl aluminium sesquichloride, aluminium tribromide, antimony trichloride, antimony pentachloride, phosphorus trichloride, phosphorus pentachloride, tin tetrachloride. Diethyl aluminium chloride, ethyl aluminium sesquichloride, ethyl aluminium dichloride, diethyl aluminium bromide, ethyl aluminium sesquibromide and/or ethyl aluminium dibromide are preferably used.

Reaction products of the aluminium compounds described as component B with halogens or halogen compounds, for example triethyl aluminium with bromine or triethyl aluminium with butyl chloride, may also be used as component C. In this case, the reaction may be carried out separately or the quantity of alkyl aluminium compound required for the reaction is added to the quantity required as component B.

Ethyl aluminium sesquichloride, butyl chloride and butyl bromide are preferred.

Inert, particulate inorganic solids with a specific surface of greater than 10 and preferably from 10 to 1,000 $m^2/g$ (BET) and a pore volume of 0.3 to 15 and preferably 0.5 to 12 ml/g are used as component D.

The specific surface (BET) is determined in the usual way by the method of S. Brunauer, P. H. Emmet and Teller, J. Anorg. Chem. Soc. 60 (2), 309 (1938) while the pore volume is determined by the centrifugation method of M. McDaniel, J. Colloid Interface Sci. 78, 31 (1980).

Particularly suitable inert inorganic solids are silica gels, clays, alumosilicates, talcum, zeolites, carbon black, inorganic oxides, such as silicon dioxide, aluminium oxide, magnesium oxide, titanium dioxide, silicon carbide, preferably silica gels, zeolites and carbon black and, more preferably, silica gel. Inert in this context means that the solids do not have a reactive surface and do not contain any adsorbed material which would prevent the formation of an active catalyst or which would react with the monomers.

The inert inorganic solids mentioned, which satisfy the above-mentioned specification and which are therefore suitable for use, are described in detail, for example, in Ullmann, Enzyclopädie der technischen Chemie, Vol. 21, pages 439 et seq. (silica gels), Vol. 23, pages 311 et seq. (clays), Vol. 14, pages 633 et seq. (carbon blacks), Vol. 24, pages 575 et seq. and Vol. 17, pages 9 et seq. (zeolites).

The inorganic solids may be used individually or in admixture with one another.

The molar ratio in which catalyst components A to D are used may be varied within wide limits.

The molar ratio of component A to component B is 1:1 to 1:1,000, preferably 1:3 to 1:200 and more preferably 1:3 to 1:100. The molar ratio of component A to component C is 1:0.4 to 1:15 and preferably 1:0.5 to 1:8.

0.1 mmol to 1 mol of component A and preferably 1 to 50 mmol of component A are used to 100 g of component D.

A further component E may also be added to catalyst components A to D. This component E is a conjugated diene which may be the same diene that is to be subsequently polymerized with the catalyst. Butadiene and isoprene are preferably used.

If component E is added to the catalyst, the quantity of E is preferably 1 to 1,000 mol and more preferably 1 to 100 mol per mol of component A. In a particularly preferred embodiment, component E is used in a quantity of 1 to 50 mol per mol of component A.

The present invention also relates to the production of the catalyst described above. The catalyst is produced by mixing components A to E in an inert solvent and/or diluent and removing the solvent or diluent by distillation, optionally in vacuo. Suitable inert solvents and/or diluents are aliphatic, cycloaliphatic and/or aromatic solvents, such as pentane, hexane, heptane, cyclohexane, benzene and/or toluene. The order in which components A to E and the inert solvent are added to the reaction mixture is arbitrary even though they have an influence on the properties of the resulting catalyst. For example, component D may be suspended in the inert solvent and component B, component A, component E and finally component C may be added to the resulting suspension in that order. The inert solvent or diluent may even be distilled off between the individual components before any further components are added, optionally in a solvent. The individual components may even be divided up and the various portions added at different times to the catalyst mixture. One preferred embodiment is characterized in that, before it is added to the catalyst mixture, component D is treated with part of component B in an inert solvent or diluent, the solvent and/or diluent is distilled off and the solid thus obtained is added to a mixture of components A, C, E and the rest of component B. Other possible sequences are (S=diluent or solvent) as follows: (1) First, add S; second, component A; third, component B; fourth, component C and finally a combination of components D and B; (2) First, add a combination of components B and D; second, component S; third, component C; fourth, component B; fifth, component E and finally component A; (3) First, add a combination of components B and D; second, component S; third, component E; fourth, component B; fifth, component C; and finally component A.

The quantity in which the inert solvent and/or diluent is used may be varied within wide limits. For economic reasons, it should be kept as small as possible. The minimum quantity is determined by the quantity and solubility of the individual components and by the pore volume of component D. The solvent and/or diluent is preferably used in a quantity of 10 to 2,000 parts per 100 parts of component D.

The production of the catalyst may take place over a wide temperature range. In general, the temperature is between the melting point and boiling point of components A to C or the inert diluent and/or solvent. The catalyst is normally produced at temperatures in the range from −20° to 80° C.

The present invention also relates to a process for the polymerization of gaseous conjugated dienes, for example 1,3-butadiene, isoprene, pentadiene or dimethyl butadiene.

The polymerization is carried out by contacting the gaseous conjugated diene with the described catalyst. Other gases may be added to the gaseous monomer either to dilute it or to dissipate heat or to control molecular weight. The polymerization may be carried out under pressures of 1 mbar to 50 bar and preferably under pressures of 1 to 20 bar.

The polymerization is generally carried out at temperatures of −20° to 250° C., preferably at temperatures of 0° to 200° C. and more preferably at temperatures of 20° to 160° C.

The polymerization may be carried out in any reactor suitable for gas phase polymerization, for example in a stirred reactor, in a rotary reactor or in a fluidized-bed reactor or in any combination of these various reactor types. To avoid any tackiness, known powdering agents may usefully be added. Any inert fine-particle solids, including in particular the inert inorganic solids used as component D, may be used as the powdering agent.

The polymers obtained have a cis-1,4-double bond content of around 60 to 99%. The molecular weight can be adjusted through the composition of the catalyst and by varying the polymerization conditions. Typical molecular weights are in the range from $10^3$ to $10^6$, as measured by GPC (gel permeation chromatography).

The Mooney viscosity, ML (1+4', 100° C.), is typically in the range from 30 to 180 MU. It is also possible by the gas-phase polymerization to produce polymers of very high molecular weight which would be extremely difficult to obtain by solution polymerization on account of the high viscosity and the possibility of transfer reactions through the solvent used.

The polymers obtained may be compounded and vulcanized in the usual way.

In one typical embodiment, the following procedure is adopted for the polymerization of 1,3-butadiene:

The catalyst consisting of components A to D and optionally E is transferred to an apparatus which is suitable for keeping the powder-form catalyst in motion. This may be done, for example, by stirring, rotation and/or a gas stream. The inert gas, for example nitrogen, initially present in the gas space is replaced by the gaseous monomer. Polymerization begins immediately and the temperature increases. The monomer —optionally diluted with an inert gas —is delivered to the reactor at such a rate that the required reaction temperature is not exceeded. The reaction temperature may be adjusted in the usual way by heating or cooling. The polymerization is terminated by shutting off the supply of monomer. The polymer may then be further treated in known manner by deactivating the catalyst and treating the polymer with known antiagers.

The following Examples are intended to illustrate the invention without limiting it in any way.

EXAMPLES

Example 1 a) Pretreatment of the Support

Vulkasil S was used as the support. Vulkasil is a silica gel made by Bayer AG with a BET surface of 230 m$^2$/g. It has a pore volume of 2.95 ml/g. Before it was used, the Vulkasil S was dried for 2 hours at 250° C. and then stirred for 20 minutes in a quantity of 100 g with a solution of 58 mmol of diisobutyl aluminium hydride (DIBAH) in 500 ml of hexane. The supernatant solution was then decanted off and the residue was dried in vacuo. The residue was then stirred for 20 minutes with another 500 ml of hexane, the supernatant solution decanted off and the residue dried.

b) Production of the Catalyst

A catalyst was produced by mixing 120 ml of anhydrous n-hexane, 150 mmol of DIBAH and 5.0 mmol of ethyl aluminium sesquichloride (EASC) in a 1 liter flask equipped with a nitrogen inlet and a magnetic stirrer. After 1.25 g of butadiene had been introduced into the solution, 5.0 mmol of neodymium versatate (NDV) were added. The resulting mixture was added to a suspension of 100 g of the support described in a) in 200 ml of n-hexane. After 5 minutes, the reaction mixture was concentrated by evaporation in vacuo to dryness. 106 g of a free-flowing powder were isolated.

c) Polymerization

The polymerization was carried out in a rotary evaporator equipped with a magnetic stirrer, a mercury pressure relief valve and connections to a vacuum pump and for the supply of gaseous nitrogen and butadiene and with a thermocouple reaching almost to the bottom of the 1 liter flask. The inclination of the rotary evaporator was adjusted in such a way that the axis of rotation formed an angle of 45° with that of the bar magnet. The apparatus had a total volume of 2 liters. 9.8 g of the catalyst were introduced under nitrogen into the flask. The apparatus was evacuated to 1 mbar and then filled with gaseous dry butadiene with the stirrer and rotary drive both switched on. The temperature rose in 1 minute to 44° C. At the same time, a reduced pressure was developed. After 9 minutes, the butadiene pressure had fallen from 1,000 to 413 mbar. The temperature was 39° C. More butadiene was introduced up to a pressure of 1,000 mbar. The temperature rose in 2 minutes to 52° C. and then fell slowly again. After another 7 minutes, the temperature was 45° C. for a butadiene pressure of 440 mbar. In the further course of the test, butadiene was added at such intervals that the temperature was kept between 30° and 90° C.

After 45 minutes, 20 g of butadiene had been consumed and the product became coarser. After 1 hour, 25 g of butadiene had been consumed.

After 4.5 hours, the stirrer and rotary drive were switched off because the product could no longer be mixed.

After 6.5 hours, the apparatus was evacuated and subsequently filled with nitrogen. By this time, 123 g of butadiene had been consumed.

22 Hours after the beginning of the test, the apparatus was re-evacuated, filled with butadiene and the test continued so that the temperature was kept between 40° and 60° C. After another 3 hours, the product formed was removed from the flask. It weighed 189.5 g. The product was shortstopped on the roll with 2 g of stearic acid and 2 g of Vulkanox BKF (a product of Bayer AG) and stabilized.

Mooney viscosity of the polymer ML (1+4', 100° C.): 147 MU Content of cis-1,4-double bonds: 96.5%

Comparison Example 1

The catalyst was prepared in the same way as described in Example 1 except that, after the addition of NDV, an aliquot of 9.25%, corresponding to the quantity used in Example 1, of catalyst of 9.8/106 (catalyst used/ yield of catalyst produced) was removed without the use of Vulkasil S.

The solution was then concentrated by evaporation in vacuo using the same apparatus as used for the polymerization in Example 1. After all the solvent had been removed at room temperature, the vacuum was eliminated with dry butadiene as described in Example 1. A greasy mass was formed on the wall of the rotating and stirred flask. The temperature rose to 59° C. in 2 minutes, the pressure falling from 1,000 mbar to 920 mbar. More butadiene was then introduced up to a pressure of 1,000 mbar. The uptake of butadiene was very slow. After the pressure had fallen to 930 mbar, butadiene was introduced in gaseous form up to a pressure of 1,000 mbar. After 1 hour, a soft polymer lump had formed. No more butadiene was taken up. The yield amounted to only 11.3 g.

Example 2

The procedure was as described in Example 1 except for the following differences:

a) Pretreatment of the Support

The Vulkasil S used was pretreated with only 2 mmol of DIBAH instead of the 58 mmol used in Example 1, based in each case on 100 g of Vulkasil S.

b) Production of the Catalyst

The following quantities were used:

| | |
|---|---|
| 120 ml | Hexane |
| 100 mmol | DIBAH |
| 5.0 mmol | EASC |
| 1.25 g | Butadiene |
| 5.0 mmol | NDV and |
| 29.7 g | Vulkasil S which was suspended in 200 ml of hexane before the catalyst solution was added. |

After the solvent had been distilled off in vacuo, 32.9 g of a free-flowing powder were isolated.

C) Polymerization 6.4 g of the catalyst were used for the gas-phase polymerization of butadiene. The polymerization was carried out as described in Example 1. Butadiene was added in only such a quantity that the temperature remained between 20° and 70° C. The polymerization was interrupted twice. To this end, the reactor was evacuated to 1 torr and subsequently charged with nitrogen. On resumption of the polymerization, the reactor was evacuated and charged with butadiene. After 6 hours, the stirrer and rotary drive were switched off because the contents of the reactor could no longer be mixed.

After a total reaction time of 18 hours, 431 g of a solid polymer with the following properties were obtained:

Mooney viscosity ML (1+4', 100° C.): 87 MU Content of cis-1,4-double bonds: 95.9%

What is claimed is:

1. A catalyst for the gas phase polymerization of conjugated dienes, wherein said catalyst consists of
A) at least one substance selected from the group consisting of:
an alcoholate of the rare earths (I),
a carboxylate of the rare earths (II),
a complex compound of the rare earths with diketones (III) and
an addition compound of the halides of the rare earths with an oxygen or nitrogen donor compound (IV) corresponding to the following formulae:

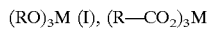

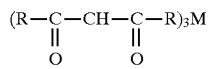

and $MX_3 \cdot y$ donor (IV),
B) at least one substance selected from the group consisting of
an aluminium tialkyl, a dialkyl aluminium hydride and an alumoxane corresponding to formulae (V)–(VIII):

$AlR_3$(V), $HAlR_2$ (VI),

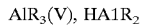

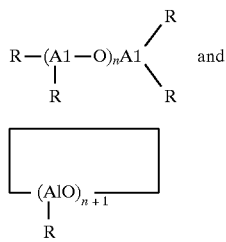

wherein:
M is atrivalent element of the rare earths with atomic numbers of 57 to 71, the R's are the same or different and represent alkyl radicals containing 1 to 10 carbon atoms,
X is chlorine, bromine or iodine,
y=1 to 6 and
n=1 to 50,
C) a compound which is different from the compound in B) and which is a Lewis acid; and
D) an inert, particulate inorganic solid with a specific surface of greater than 10 m²/g (BET) and a pore volume of 0.3 to 15 ml/g, further wherein said catalyst is in the form of a dry powder during at least a portion of the gas phase polymerization of said conjugated dienes.

2. A catalyst as claimed in claim 1, characterized in that the molar ratio of component A to component B is 1:1 to 1:1,000.

3. A catalyst as claimed in claim 1, charactertzed in that the molar ratio of component A to component C is 1:0.4 to 1:15.

4. A catalyst as claimed in claim 1, characterized in that component A is used in quantities of 0.1 mmol to 1 mol per 100 g of component D. order in an inert organic solvent and/or diluent at temperatures of −20 to 80° C., after which the solvent and/or diluent used is separated from the catalyst.

5. A process for the production of the catalyst claimed in claim 1, characterized in that components A to D are mixed in any order in an inert organic solvent and/or diluent at temperatures of −20° to 80° C., after which the solvent and/or diluent used is separated from the catalyst to form a dry catalyst.

6. A catalyst as claimed in claim 1, wherein the Lewis acid of component C is selected from the group consisting of methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, aluminum tribromide, antimony trichloride, antimony pentachloride, phosphorus trichloride, phosphorus pentachloride and tin tetrachloride.

7. A catalyst for the gas phase polymerization of conjugated dienes, wherein said catalyst consists of
A) at least one substance selected from the group consisting of:
an alcoholate of the rare earths (I),
a carboxylate of the rare earths (II),
a complex compound of the rare earths with diketones (III) and
an addition compound of the halides of the rare earths with an oxygen or nitrogen donor compound (IV) corresponding to the following formulae:

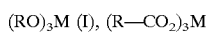

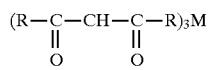

and $MX_3 \cdot y$ donor (IV),
B) at least one substance selected from the group consisting of:
an aluminium trialkyl, a dialkyl aluminium hydride and an alumoxane corresponding to formulae (V)–(VIII):

$A R_3$(V), $HA R_2$ (VI),

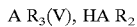

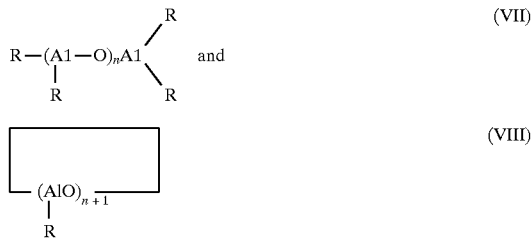

wherein:
M is a trivalent element of the rare earths with atomic numbers of 57 to 71, the R's are the same or different and represent alkyl radicals containing 1 to 10 carbon atoms,
X is chlorine, bromine or iodine,
y=1 to 6 and
n=1 to 50,
C) a compound which is different from the compound in B) and which is a Lewis acid;
D) an inert, particulate inorganic solid with a specific surface of greater than 10 m²/g (BET) and a pore volume of 0.3 to 15 ml/g; and
E) a conjugated diene, further wherein said catalyst is in the form of a dry powder during at least a portion of the gas phase polymerization of said conjugated dienes.

8. A catalyst as claimed in claim 7, characterized in the component E is used in quantities of 1 to 1,000 mol per mol of component A.

9. A catalyst as claimed in claim 7, wherein the Lewis acid of component C is selected from the group consisting of methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, aluminum tribromide, antimony trichloride, antimony pentachloride, phosphorus trichloride, phosphorus pentachloride and tin tetrachloride.

10. A catalyst as claimed in claim 7, characterized in that the molar ratio of component A to component B is 1:1 to 1:1,000.

11. A catalyst as claimed in claim 7, characterized in that the molar ratio of component A to component C is 1:0.4 to 1:15.

12. A catalyst as claimed in claim 7, characterized in that component A is used in quantities of 0.1 mmol to 1 mol per 100 g of component D.

13. A process for the production of the catalyst claimed in claim 7, characterized in that components A to E are mixed in any order in an inert organic solvent and/or diluent at temperatures of −20° to 80° C., after which the solvent and/or diluent used is separated from the catalyst to form a dry catalyst.

14. A catalyst as claimed in claim 7, wherein component E is present in an amount of 1 to 1,000 mol per mol of component A.

15. A catalyst as claimed in claim 7, wherein component E is present in an amount of 1 to 100 mol per mol of component A.

16. A catalyst for the gas phase polymerization of conjugated dienes, wherein said catalyst consists of A) at least one substance selected from the group consisting of:
an alcoholate of the rare earths (I),
a carboxylate of the rare earths (II),
a complex compound of the rare earths with diketones (III) and
an addition compound of the halides of the rare earths with an oxygen or nitrogen donor compound (IV) corresponding to the following formulae:

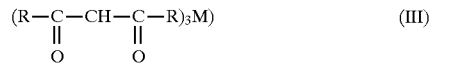

and $MX_3 \cdot y$ donor (IV),

B) at least one substance selected from the group consisting of:
an aluminium trialkyl, a dialkyl aluminium hydride and an alumoxane corresponding to formulae (V)–(VIII):

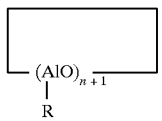

wherein:
M is lanthanum cerium, praseodymium or neodymium or a mixture of elements of the rare earths with atomic numbers of 57 to 71 which contains at least 10% by weight of at least one of the elements lanthanum, cerium, praseodymium or neodymium,
the R's are the same or different and represent alkyl radicals containing 1 to 10 carbon atoms,
X is chlorine, bromine or iodine,
y=1 to 6 and
n=1 to 50, C) a Lewis acid selected from the group consisting of methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, aluminum tribromide, antimony trichloride, antimony pentachloride, phosphorus trichloride, phosphorus pentachloride and tin tetrachloride;

D) an inert, particulate inorganic solid with a specific surface of greater than 10 m$^2$/g (BET) and a pore volume of 0.3 to 15 ml/g; and E) a conjugated diene, further wherein said catalyst is in the form of a dry powder during at least a portion of the gas phase polymerization of said conjugated dienes.

17. A catalyst as claimed in claim 16, wherein the conjugated diene is butadiene or isoprene.

18. A catalyst as claimed in claim 16, wherein the inert, particulate inorganic solid is selected from the group consisting of silica gels, zeolites and carbon black.

19. A catalyst as claimed in claim 16, wherein component C is a Lewis acid selected from the group consisting of diethyl aluminum chloride, ethyl aluminum sesquichloride, ethyl aluminum dichloride, diethyl aluminum bromide, ethyl aluminum sesquibromide and ethyl aluminum dibromide.

20. A catalyst for the gas phase polymerization of conjugated dienes, wherein said catalyst consists of A) at least one substance selected from the group consisting of:
an alcoholate of the rare earths (I),
a carboxylate of the rare earths (II),
a complex compound of the rare earths with diketones (III) and
an addition compound of the halides of the rare earths with an oxygen or nitrogen donor compound (IV) corresponding to the following formulae:

and $MX_3 \cdot y$ donor (IV),

B) at least one substance selected from the group consisting of:
an aluminium trialkyl, a dialkyl aluminium hydride and an alumoxane corresponding to formulae (V)–(VIII):

$AR_3(V), HAR_2$ (VI),

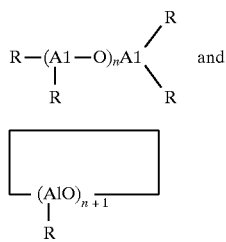 (VII)

and (VIII)

wherein:
M is a trivalent element of the rare earths with atomic numbers of 57 to 71, the R's are the same or different and represent alkyl radicals containing 1 to 10 carbon atoms,
X is chlorine, bromine or iodine,
y=1 to 6 and
n=1 to 50, C) a compound which is different from the compound in B) and which is a Lewis acid; and D) an inert, particulate inorganic solid with a specific surface of greater than 10 $m^2/g$ (BET) and a pore volume of 0.3 to 15 ml/g, said catalyst being produced by a process comprising the following steps:

mixing components A to D in any order in an inert organic solvent and/or diluent at temperatures of $-20°$ to $80°$ C., separating the solvent and/or diluent from the catalyst to form a dry catalyst.

21. A catalyst as claimed in claim 20, wherein after the catalyst is separated from the solvent and/or diluent, the catalyst is a dry powder.

* * * * *

UNITED STATES PATENT AND TRADEMARK OFFICE
CERTIFICATE OF CORRECTION

PATENT NO.   : 5,858,903
DATED        : January 12, 1999
INVENTOR(S)  : Sylvester et al.

It is certified that error appears in the above-identified patent and that said Letters Patent is hereby corrected as shown below:

In column 9, line 22 "tialkyl" should read -- trialkyl--. In column 9, line 37, "atrivalent" should read -- a trivalent--. In column 9, lines 59-61 "order in an inert organic solvent and/or diluent at temperatures of -20 to 80°C., after which that solvent and/or diluent used is separated from the catalyst." should be deleted. In column 10, line 38, "A $R_3$(V), HA $R_2$" should read --Al$R_3$(V), HAl$R_2$--. Column 10, line 65, "in the" should read --in that--. Column 11, line 61, "A $R_3$(V), HA $R_2$" should read --Al$R_3$(V), HAl$R_2$--. Column 12, line 8, "lanthanum cerium," should be --lanthanum, cerium,--. Column 13, line 1, "A $R_3$(V), HA $R_2$" should read --Al$R_3$(V), HAl$R_2$--.

Signed and Sealed this

Tenth Day of October, 2000

Attest:

Attesting Officer

Q. TODD DICKINSON
Director of Patents and Trademarks